United States Patent Office 2,953,584
Patented Sept. 20, 1960

2,953,584

PHOSPHINIC ACID DERIVATIVES AND METHODS FOR PREPARING SAME

Sheldon A. Buckler, Stamford, and Vernon P. Wystrach, Darien, Conn., assignors to American Cyanamid Company, New York, N.Y., a corporation of Maine No Drawing. Filed June 27, 1957, Ser. No. 668,332

10 Claims. (Cl. 260—403)

The present invention relates to new and novel compounds and to a method for their preparation. More particularly, it relates to phosphinic acid derivatives derived from α-ketoalkanoic acids and hypophosphorous acid. Still more specifically, the invention is concerned with bis(1-alkyl-1-carboxy-1-hydroxymethyl)phosphinic acids and neutral alkali metal and alkaline earth metal salts thereof which may be represented by the general formula:

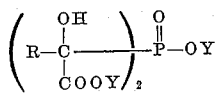

wherein Y is hydrogen, an alkali metal including lithium, sodium and potassium or an alkaline earth metal, such as calcium, barium and strontium, and R is an alkyl radical containing of from 1 to 17 carbon atoms.

The compounds of the present invention are particularly useful as sequestering agents in the selective removal of heavy metal values from mixtures containing ions, such as nickel, cobalt, copper, iron, uranyl and thorium (IV) in the presence of alkali and alkaline earth ions. Thus, for example, ferric ion may be sequestered selectively from an alkaline solution containing both iron and calcium ions. In an application of this phenomenon, iron chlorosis in soil can be prevented or alleviated by treating an alkaline soil with the phosphinic acid derivative above-defined, such that a solubilized iron complex is formed in preference to the formation of the calcium complex. In addition, uranyl values can be selectively leached from an ore containing the same by employing techniques known in the art, as shown by Blake et al. in the Atomic Energy Commission Report ORNL–1903, May 13, 1955. Moreover, in the sizing of paper, ferric ion may be removed as a complex from the alum, which ion would otherwise cause discoloration in the finished product.

The bis(1-alkyl-1-carboxy-1-hydroxymethyl)phosphinic acids of the present invention may be prepared in a straight-forward manner. This involves bringing into reactive combination an α-ketoalkanoic acid containing from 3 to 19 carbon atoms, and isomers thereof, with hypophosphorous acid until reaction is complete. The reaction takes place over a wide range of temperatures, usually from 20° C. to 100° C. A solid product is obtained. It is recrystallized from a suitable solvent, such as acetic acid.

Typically illustrative of the α-ketoalkanoic acid employed in the process of the invention are: pyruvic acid (α-ketopropionic acid), α-ketobutyric acid, α-ketopentanoic acid, α-ketooctanoic acid, α-ketododecanoic acid, α-ketotetradecanoic acid, α-ketononadecanoic acid, and equivalents thereof. In general, the products prepared by the present invention are formed, as indicated above, by reacting approximately two moles of an α-ketoalkanoic acid with one mole of a hypophosphorus acid. However, the mole ratio of reactants may be varied without appreciably effecting the yield of product. Thus, for example, approximately up to about 2.5 moles of the α-keto acid may be reacted with about one mole of the hypophosphorous acid.

Hypophosphorous acid may be employed in the process of the invention either in an aqueous or in a non-aqueous environment. Inert organic solvents may be used, as for example ether, acetone, tetrahydrofuran and dioxane. Alternatively, an alkali metal salt of hypophosphite, such as sodium hypophosphite in the presence of a mineral acid such as hydrochloric acid, can be substituted for hypophosphorous acid.

Reaction can be completed within about 30 minutes and about 4 hours depending upon the temperature selected. Phosphinic acid derivative may be permitted to stand at room temperature for about 5 to 7 days to obtain a precipitate which can be filtered. However, the desired phosphinic acid derivative may be recovered swiftly by evaporation and, if desired, resultant acid derivative can be recrystallized from acetic acid. Moreover, when the reaction is complete, sufficient alkali may be added to the reaction mass to form the neutral salt of the acid. Resultant salt is obtained as a solid by evaporating the neutralized reaction mass. Typical alkaline neutralization agents include the alkali metal hydroxide, carbonates, bicarbonates and equivalents thereof, as for example, the hydroxides of sodium, potassium, lithium, and the carbonates or bicarbonates of the latter metals. Also contemplated as neutralization agents are the alkaline earth hydroxides, oxides and carbonates of such metals as calcium, barium and strontium.

The invention will be further illustrated in the following examples which are not to be construed as limitative. Unless otherwise stated, the parts given are by weight.

EXAMPLE 1

*Preparation of bis(1-methyl-1-carboxy-1-hydroxymethyl)-phosphinic acid*

132 parts of 50% hypophosphorous acid in water is mixed with 176 parts of pyruvic acid in a suitable vessel at room temperature. In three and one-half hours, reaction is completed. The contents are evaporated over a steam bath under reduced pressure. Residue is filtered under vacuum and recrystallized from acetic acid. There is then obtained 121.6 parts of product, identified by infra-red examination as bis(1-methyl-1-carboxy-1-hydroxymethyl)phosphinic acid. The latter compound has a melting point of 148° C. to 149° C. and is soluble in water and alcohol. It has a theoretical neutralization equivalent equal to 80.7 and the neutralization equivalent found equals 80.9.

EXAMPLE 2

The procedure of Example 1 is followed in every detail except that an equal mixture of sodium hypophosphite and hydrochloric acid in either is substituted for the hypophosphorous acid of the preceding example.

EXAMPLE 3

*Preparation of bis(1-ethyl-1-carboxy-1-hydroxymethyl)-phosphinic acid*

As in the preceding Example 1, approximately 2 moles of α-ketobutyric acid is reacted with a 50% aqueous solution of hypophosphorous acid in an amount sufficient to supply approximately 1.1 moles of the acid. The mixture is mixed at 80° C. for 75 minutes. The reaction mass is allowed to stand at room temperature for about six days. Thereafter, excess water is removed therefrom by distillation, and a solid is obtained in good yield. It is recrystallized from acetic acid and is found to be bis-(1-ethyl-1-carboxy-1-hydroxymethyl)phosphinic acid as determined by infra-red examination. Its melting point is 153° C.–154° C. and its found N.E. (i.e., neutralization equivalent) equals 90.8, whereas its theoretical N.E. equals 90.1.

Calculated for $C_8H_{15}O_8P$: C=35.56; H=5.60; P=11.47. Found: C=35.28; H=5.66; P=11.36.

EXAMPLE 4

*Preparation of bis(1-heptadecyl-1-carboxy-1-hydroxymethyl)phosphinic acid*

To a suitable vessel containing 3.1 parts of α-ketononadecanoic acid there is charged 1.35 parts of 50% hypophosphorous acid in 10 parts of dioxane. A temperature of about 40° C. for eight days is maintained. Thereafter, the solvent is removed and a waxy solid, which has a neutralization equivalent of 236, is obtained.

EXAMPLE 5

*Preparation of trisodium bis(methyl-1-carboxy-1-hydroxymethyl)phosphinate*

132 parts of 50% hypophosphorous acid in water is thoroughly mixed with 176 parts of pyruvic acid in a suitable vessel. After the exothermic reaction subsides, the mixture is allowed to stand at a temperature of 30° C.–40° C. for an additional two hours, whereupon it is neutralized to pH 8–9 with a solution of 50% aqueous sodium hydroxide. The final solution contains about 60%–65% dissolved solids which comprise the trisodium salt. Solid trisodium salt is next recovered as a crystalline solid by evaporation of water from the aqueous solution. Trisodium bis(1-methyl-1-carboxy-1-hydroxymethyl)-phosphinate is a hygroscopic, white crystalline solid which melts at 120° C.–128° C. and then resolidifies, whereafter it remains solid at temperatures up to 300° C.

The corresponding potassium, lithium and calcium salts are obtained in a similar manner.

EXAMPLE 6

This example illustrates the formation of a ferric ion complex of bis(1-methyl-1-carboxy-1-hydroxymethyl)-phosphinic acid in an alkaline solution.

In a suitable vessel, bis(1-methyl-1-carboxy-1-hydroxymethyl)phosphinic acid (0.25 part) is dissolved in water to make 100 parts of solution. The basicity of the solution is adjusted to pH 8 with sufficient sodium hydroxide. 20 parts of a ferric ammonium sulfate solution, containing 0.01 part of ferric ion per part of solution, is added. The solution is deep reddish-brown in color. Although the solution contains 3.6 moles of ferric ion per mole of complexing agent, precipitation of ferric hydroxide is not observed after several weeks standing.

EXAMPLE 7

The preceding example is repeated in every material aspect except the pH was increased from 8 to 11. The result was substantially the same.

EXAMPLE 8

This example shows the effect of various heavy metal ions other than ferric ion. As in Example 6, 0.01 molar solutions of the phosphinic compound of Example 6 are reacted with molar equivalents of the several ions as tabulated below:

| Ion | pH | Comment |
|---|---|---|
| Cupric | 10.1–11.7 | No Precipitate. |
| Nickel+2 | 2.6–11.8 | Do. |
| Palladium | 2.2–11.5 | Do. |
| Thorium+4 | 11.5–12.0 | Do. |
| Uranyl+2 | 10.7–11.8 | Do. |

From the above data, the versatility of the phosphinic acid derivatives of our invention as sequestering agents over a wide pH range can be readily seen.

We claim:

1. A phosphinic acid derivative selected from the group consisting of the bis(1-alkyl-1-carboxy-1-hydroxymethyl)-phosphinic acids characterized by the formula:

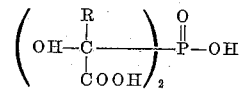

in which R is an alkyl group containing from 1 to 17 carbon atoms and the alkali metal and alkaline earth metal salts thereof and the heavy metal complexes the same.

2. As a new compound, bis(1-methyl-1-carboxy-1-hydroxymethyl)phosphinic acid.

3. As a new compound, bis(1-ethyl-1-carboxy-1-hydroxymethyl)phosphinic acid.

4. As a new compound, bis(1-heptadecyl-1-carboxy-1-hydroxymethyl)phosphinic acid.

5. As a new compound, trisodium bis(1-methyl-1-carboxy-1-hydroxymethyl)phosphinate.

6. As a new compound, ferric iron complex of bis-(methyl-1-carboxy-1-hydroxymethyl)phosphinic acid.

7. A process for producing a bis(1-alkyl-1-carboxy-1-hydroxymethyl)phosphinic acid which comprises: reacting at least two mol proportions of an α-ketoalkanoic acid containing of from 3 to 19 carbon atoms with about one mol proportion of hypophosphorous acid at a temperature up to about 100° C., and recovering the resultant bis(1-alkyl-1-carboxy-1-hydroxymethyl)phosphinic acid.

8. A process according to claim 7 in which the α-ketoalkanoic acid is pyruvic acid.

9. A process according to claim 7 in which the α-ketoalkanoic acid is α-ketobutyric acid.

10. A process according to claim 7 in which the α-ketoalkanoic acid is α-ketononadecanoic acid.

References Cited in the file of this patent

FOREIGN PATENTS 69,243     Switzerland              Dec. 2, 1914

UNITED STATES PATENT OFFICE
CERTIFICATE OF CORRECTION

Patent No. 2,953,584  
September 20, 1960

Sheldon A. Buckler et al.

It is hereby certified that error appears in the printed specification of the above numbered patent requiring correction and that the said Letters Patent should read as corrected below.

Column 3, lines 20 and 21, for "(methyl-1-carboxy-1-hydroxymethyl)" read -- (1-methyl-1-carboxy-1-hydroxymethyl) --; column 4, line 29, after "complexes" insert -- of --; lines 40 and 41, for "(methyl-1-carboxy-1-hydroxymethyl)" read -- (1-methyl-1-carboxy-1-hydroxymethyl) --.

Signed and sealed this 25th day of April 1961.

(SEAL)  
Attest:

ERNEST W. SWIDER  
Attesting Officer

DAVID L. LADD  
Commissioner of Patents